April 3, 1956 E. H. SHAFF 2,740,507
TORQUE CONTROL MEANS FOR POWER OPERATED
NUT SETTERS AND THE LIKE
Filed Dec. 24, 1952 5 Sheets-Sheet 3

INVENTOR
Ernest H. Shaff
By: Carlson, Pitzner, Hubbard & Wolfe
ATTORNEY

United States Patent Office 2,740,507
Patented Apr. 3, 1956

2,740,507

TORQUE CONTROL MEANS FOR POWER OPERATED NUT SETTERS AND THE LIKE

Ernest H. Shaff, Penn Park, Hamilton, Ind., assignor, by mesne assignments, to Gardner-Denver Company, a corporation of Delaware Application December 24, 1952, Serial No. 327,804

14 Claims. (Cl. 192—.034)

The present invention relates generally to portable power driven tools such as nut setters and the like and more particularly to an improved torque responsive control for such tools.

With tools of this general type heretofore available, considerable difficulty has been experienced in achieving accurate torque settings of screw-threaded fastening elements when they are run and set. In most instances the time involved is extremely short between the point when the so-called setting resistance of the fastening element is first encountered upon completion of free-running thereof and the point when the desired torque setting obtains. This is practically instantaneous when the thread travel beween these points is on the order of one-fourth to one-half of a revolution of the screw-threaded fastening element, as is frequently the case. It has been determined that one of the primary deterrents to the attainment of accurate torque settings of fastening elements by prior power actuated tools is the imparting to the fastening element of the considerable momentum of the rotating driving components of the tool during the time required for its overload release means to operate. As a result, the fastening element is tightened substantially more than is desired.

Accordingly, it is the general object of the present invention to provide an improved torque responsive control for a power actuated tool adapted to run and set screw-threaded fastening elements which, upon the attainment of a desired torque setting by a fastening element being driven thereby, effectually interrupts the connection between the driving components of the tool and the driven components thereof so as to permit independent rotation of the former to the end that their momentum is not transmitted to the fastening element being set.

The object of the invention thus generally set forth, together with other objects and ancillary advantages, are attained by the construction and arrangement shown by way of illustration in the accompanying drawings, in which.

While the invention is susceptible of various modifications and alternative constructions, there are shown in the drawings and will herein be described in detail the preferred embodiments, but it is to be understood that it is not thereby intended to limit the invention to the specific forms disclosed. On the contrary, it is intended to cover all modifications and alternative constructions falling within the spirit and scope of the invention as expressed in the appended claims.

As illustrated in the drawings, the first of the exemplary forms of the invention is shown embodied in a portable, pneumatic nut setter which includes a generally cylindrical casing 10, having a rotary pneumatic motor 11 therein for driving a spindle 12 through the medium of a driving mechanism which includes a clutch generally indicated at 14. As shown, the casing 10 is equipped with a laterally projecting handle 15. The handle has conveniently incorporated therein a throttle valve mechanism 16 for controlling the supply of pressure fluid, in this instance compressed air, to the motor 11 of the tool. The handle is equipped at its outer end with a suitable fitting 18 for the reception of a pressure fluid supply hose.

The motor 11 is of conventional form and includes a vaned rotor 19 supported on a shaft 20 and rotatable in an eccentrically disposed motor chamber 21 defined by a cylinder 22 and end plates 24, the latter being disposed at opposite ends of the cylinder. The end plates 24 are conveniently recessed for the reception of bearings 25 for journaling the motor shaft 20.

From the valved handle 15 pressure fluid is supplied to the motor chamber 21 by way of a tortuous passage 26 formed in the casing 10 and by way of a tube 27 interposed between the handle 15 and a boss 28 formed integral with the casing. The tube 27 additionally serves to support the handle 15 on the casing. From the passage 26 live pressure fluid is admitted to the motor chamber 21 by way of an inlet port 29 formed in the rear end plate 24. Spent pressure fluid is exhausted from the motor chamber by way of exhaust slots 30 formed in the cylinder 22, and an annular exhaust chamber 31 about the cylinder, and vents by way of ports 32 formed in the casing 10 to the atmosphere.

The driving connection between the motor 11 and the spindle 12 includes not only the clutch 14 but also speed reduction gearing. This speed reduction gearing is of the planetary type and includes a driving gear 34, rigid with the forward end of the motor shaft 20 and idler or planetary gears 35, which are rotatable within a fixed ring gear 36. The planetary gears 35 are rotatable on pins 37 carried by a spider 38. The spider 38 is formed with a peripheral groove 38a which serves as an inner race for anti-friction bearing elements 40, here shown in the form of balls. The outer race for the balls 40 is formed by an internally grooved ring 41 fixed within the casing 10.

As shown, the clutch 14 is of the friction disk type. The disk-like driving elements 39 thereof are splined to a stub shaft 42 fixed centrally of the spider 38 and projecting forwardly therefrom. The driven elements 43 of the clutch are also of disk form and are interleaved between the driving clutch disks 39. The driven clutch disks are keyed to spindle 12. For this purpose, the rear end of the spindle is of enlarged cup-like form and is provided with a series of spaced, longitudinal grooves 12a in its inner surface for the reception of key-like projections 43a formed integral with each of the driven clutch elements. The spindle 12 is journaled intermediate its ends in the forward end of the casing 10 by means of an anti-friction bearing which is preferably of the radial-thrust type. The forward end of the spindle is squared and is provided with suitable detent means for the reception of a socket adapter or the like (not shown) to accommodate the same to a fastening element which is to be driven by the tool.

In accordance with the present invention, means responsive to the admission of pressure fluid to actuate the tool is provided to effect a driving connection between the motor 11 and the spindle 12, and additionally means which is normally conditioned to admit pressure fluid is provided to interrupt the supply of pressure fluid immediately upon the attainment of the desired torque setting of a fastening element being driven by the tool. By this arrangement, just as soon as the desired torque setting obtains, the driving connection between the motor and the spindle is broken thereby preventing transmittal to the fastening element of the momentum acquired by the driving components of the tool during the running of the fastening element and permitting this momentum to be harmlessly dissipated.

To this end pressure fluid supplied to the tool is also used to produce engagement of the clutch 14, and the valved handle 15 of the tool is constructed so as to cut off pressure fluid supply in response to the attainment of a desired torque setting by a fastening element being driven. When the pressure fluid supply is interrupted the clutch 14 is no longer held in engaged condition with the result that driving components of the tool, including the rotor 19 of the motor 11, the components operatively connected thereto, and the driving clutch elements 39 are permitted to rotate freely and independently of the driven clutch elements 43 and the spindle 12.

In the first of the illustrative forms of the invention, the means responsive to the application of pressure fluid to effect a driving connection between the motor 11 and the spindle 12 includes a piston 45 which is reciprocable in a cylinder 46 under the action of live pressure fluid and is operative through a push rod 48 to effect engagement of the clutch 14. As shown, the cylinder 46 is in the form of a recessed plug-screw threaded into the rear end of the casing 10. Intermediate its ends the plug is provided with a peripheral channel which together with the adjacent portion of the casing defines an annular chamber 49. Pressure fluid is supplied to the chamber 49 from the main pressure fluid supply passage 26 by way of a diagonally disposed passage 50. From the chamber 49 pressure fluid is admitted into the cylinder 46 through a series of circumferentially spaced ports 51.

The push rod 48 extends coaxially through the hollow motor shaft 20 and partially through the driving stub shaft 42 of the clutch 14. At its rear end, the push rod is seated in a bearing 52 carried by the piston 45.

In order to transmit force from the piston 45 to the clutch 14 so as to press the driving disks 39 into engagement with the driven disks 43 thereof, a pin 54 and a pressure plate 55 are interposed between the forward end of the push rod 48 and the uppermost one of the driven clutch disks 43. The pin 54 is received in a transversely disposed, axially elongated slot 56 formed intermediate the ends of the stub shaft 42. The ends of the pin 54 bear on the upper surface of the plate 55.

When pressure fluid is admitted to the tool, some of it is directed from the main supply passage 26 by way of the passage 50, chamber 49 and the ports 51 into the cylinder 46 behind the piston 45. The force exerted thereby on the piston 45 is transmitted by the push rod 48, the pin 54 and the plate 55 to the clutch 14. It will be seen, therefore, that the clutch 14 is engaged, and the driving connection thus effected between the motor 11 and the spindle 12 is maintained so long as pressure fluid is supplied to actuate the tool.

As previously noted, the valved handle 15 is constructed and arranged to interrupt the supply of the pressure fluid to the tool upon the attainment of a desired torque setting of a fastening element being driven by the tool. To this end the handle, which is equipped with the valve 16, is provided with a valve operating mechanism normally conditioned to permit the supply of pressure fluid to actuate the tool upon operation thereof which mechanism is effective to cut off the supply of pressure fluid upon relative movement between the handle 15 and the casing 10 in response to the setting resistance offered by the fastening element.

To provide for relative movement between the handle 15 and the casing 10, the tube 27, which is interposed between the handle 15 and the hollow boss 28 on the casing 10, is fashioned so as to be somewhat flexible. It is, however, preferably stiff enough so that there will be substantially no bending when the tool is simply picked up by the handle 15.

The handle 15 has an axial bore 60 therein within the forward end of which the tube 27 is received and within the rear end of which is received the hose fitting 18. Disposed intermediate the ends of the bore 60 is the valve 16. This valve includes a bushing 61 which is fixed within the bore 60 and is provided with a longitudinally-elongated, coaxial recess 62. The valve 16 also includes a poppet-type valve element 64 which seats against the rear end of the bushing 61, the same being normally biased into closed position by means of a spring 65. Within the bushing recess 62 is a valve stem 66 which is axially shiftable both with respect to the bushing 61 and the valve member 64. The valve stem 66 is hollow and is normally biased forwardly in the bushing recess 62 and out of engagement with the valve member 64 by means of a light spring 68.

The operating mechanism for the valve 16 includes an operating lever 70. The lever 70 is of articulated form having a fingerpiece 71 normally disposed along one side of the handle 15 for convenient manipulation and a valve operating piece 72. The latter is received in a slot 74 which extends transversely through the handle 15 and the forward end portion of the bushing 61. At their adjacent ends the valve operating piece 72 is bifurcated and the fingerpiece 71 is provided with a depending tang 71A. The tang 71A is received within the bifurcated upper end of the valve operating piece 72, and the two pieces are pivoted together as by a pin 73. The tang 71A and the bifurcated end of the valve operating piece 72 are so formed that the valve operating piece can move forwardly (in a clockwise direction, as viewed in Figs. 3 and 4) about the pivot pin 73. However, relative movement in the opposite direction is prevented.

Adjacent its lower end the valve operating piece 72 of the lever 70 is fulcrumed on a pin 75 carried by the handle 15. The pin 75 projects rearwardly into the slot 74 and its outer end is made of generally hemispherical form for reception in a somewhat larger hemispherical recess adjacent the lower end of the valve operating piece 72.

Figure 3:
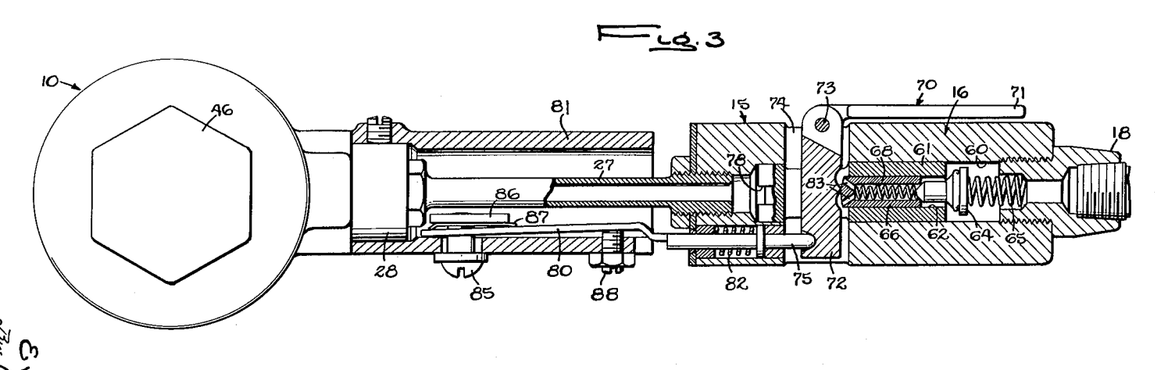
Figs. 3 and 4 are plan views partly in section, which sections are similar to Fig. 2, illustrating different component relationships under various operating conditions.
Figure 4:
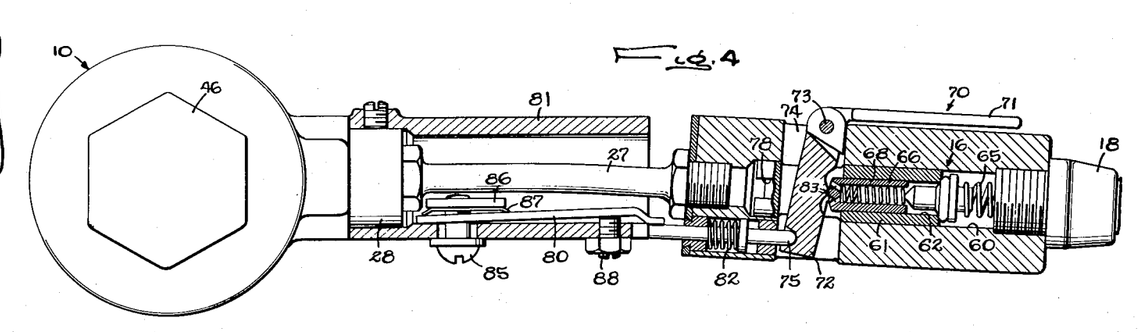
Figure 5:
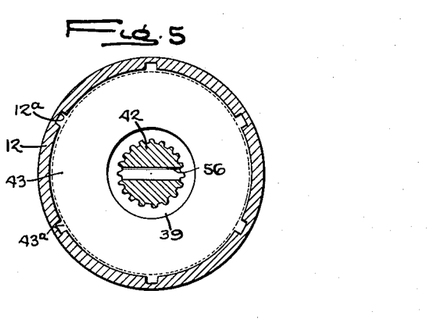
Fig. 5 is a transverse section taken substantially in the plane of line 5—5 in Fig. 1.
Figure 6:
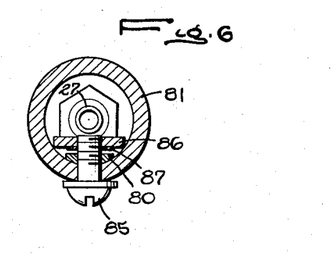
Fig. 6 is a transverse section taken substantially in the plane of line 6—6 in Fig. 2.
Figures 7, 9:
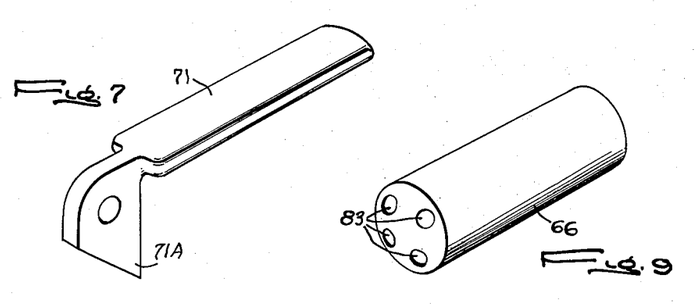
Fig. 7 is a perspective view of the finger-piece of the valve operating lever of the instant tool.
Fig. 9 is a perspective view of the stem portion of the control valve of the tool.
Figure 8:
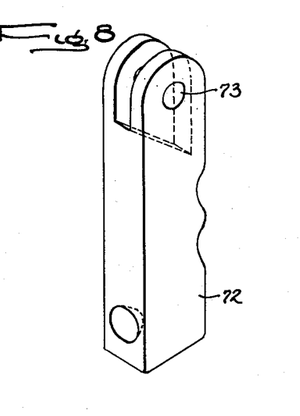
Fig. 8 is a perspective view of the valve operating member of the valve operating lever.
Figure 10:
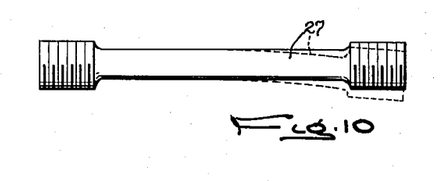
Fig. 10 is a side elevation of the tubular supporting member by means of which the operating handle and the tool body are connected.

With the valve operating mechanism normally conditioned to admit pressure fluid to actuate the tool, upon depressing the finger-piece 71 of the lever 70 the valve operating piece 72 thereof is moved rearwardly into a substantially upright position as seen in Fig. 3. Intermediate its ends the valve operating piece is in engagement with the forward end of the valve stem 66. Thus, rearward movement of the piece 72 produces similar movement of the valve stem 66 with the result that it is moved against the action of the spring 68 into engagement with the valve member 64 to the end that the valve member is unseated. Pressure fluid in the handle bore 60 behind the bushing 61 is thus supplied by way of ports 76 and a pair of longitudinal channels 78 in the bushing 61 to the forward end of the handle bore 60, and thence by way of the tube 27 to the main air supply passage 26 in the casing 10.

Figures 1, 2:
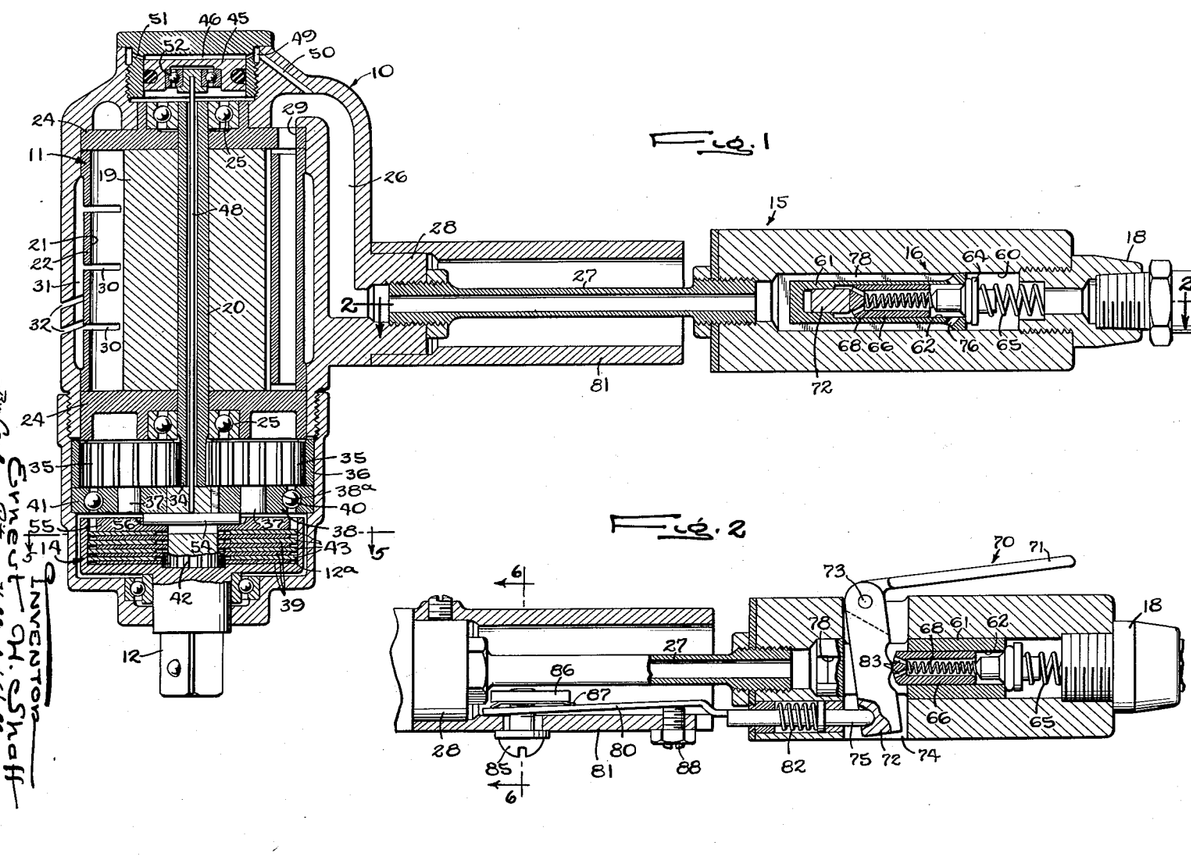
Figure 1 is a central longitudinal section through a tool embodying the features of the present invention.
Fig. 2 is a fragmentary longitudinal section taken substantially in the plane of line 2—2 in Fig. 1.

Means is provided to utilize the relative movement between the handle 15 and the casing 10, that occurs when a fastening element being driven by the tool is run down tight to release the valve 16 so as to interrupt the supply of pressure fluid. For this purpose the valve operating mechanism includes trigger means effective to permit forward movement of the valve operating piece 72 of the lever 70 so as to release the valve stem 66 and permit the valve member 64 to be seated by the action of the spring 65 and fluid pressure thereon. In the present instance, this trigger means includes the fulcrum pin 75 and a latch member 80. The latch member is adjustably supported within a housing 81 which is rigid with the boss 29 and projects rearwardly therefrom. The housing 81 terminates in spaced relation to the handle 15. The pin 75 is longitudinally shiftable within the handle 15 and is normally biased rearwardly by means of a spring 82. The forward end of the pin projects forwardly from the handle 15 where it is adapted to engage the rear end of the latch member 80. The forward and rear ends of the members 75 and 80, respectively, are so formed that upon relative transverse movement therebetween they can become disengaged. It will be seen that the spring 82 in its action to bias the pin 75 rearwardly, also serves to bias the operating lever into its normal, or "at rest," position as shown in Fig. 2. More particularly, rearward motion of the pin 75 under the influence of the spring 82 serves to move the lower end of the valve operating piece 72 rearwardly with a corresponding forward movement of the upper end thereof. Since the construction of the lever, as previously described, is such that clockwise movement of the fingerpiece 71 with respect to the valve operating piece 72 is prevented, the fingerpiece 71 is raised into position shown in Fig. 2 upon rearward movement of the lower end of the piece 72.

When the desired torque setting of the fastening element being driven obtains and relative lateral movement is produced between the handle 15 and the casing 10, relative movement between the handle 15 and the latch member 80 is also effected. As a result, the forward end of the pin 75 is moved laterally so that it can slip from engagement with the end of the latch member 80. When the pin 75 does slip from engagement with the latch member 80, the pin is freed for forward movement. So, too, the lower end of the valve operating piece 72 of the lever 70 is permitted to move forwardly into the position shown in Fig. 4. Thus, the valve stem 66 is released to the action of its biasing spring 68 whereupon it is disengaged from the valve member 64. The valve member 64 therefore is released to the action of the spring 65 and to the action of fluid pressure thereon to the end that it is seated. The result is that the supply of pressure fluid to the tool is interrupted at substantially the same instant as that when desired torque setting of the driven fastening obtains.

Provision is made for the release of fluid pressure in the cylinder 46 when the supply of pressure fluid tool is interrupted so that with the interruption of the supply pressure fluid to the tool the clutch 14 is released and the driving connection between the motor 11 and spindle 12 is broken. It will be seen that the cylinder 46, the ports 51, the chamber 49, the passages 50 and 26, and tube 27 and the forward end of the handle bore 60 are continuously in communication with each other. In order to release fluid pressure in these elements as soon as the supply of pressure fluid is interrupted by the closure of the valve member 64, the channels 78 and the ports 76 in the valve bushing 61 are arranged to be connected to the atmosphere simultaneously with the closure of the valve members 64. To this end the hollow valve stem 66 is provided with ports 83 in the forward end thereof which open into the transverse handle slot 74. Thus, when the valve stem 66 is released to the action of its spring 68 and is moved forwardly thereby out of engagement with the forward end of the valve member 64, communication with the atmosphere is immediately established and any residual fluid pressure is released. Thus, there is no resistance to upward movement of the piston 45 and the clutch 14 freely disengages.

Provision is made for adjusting the torque setting of the tool. That is to say, in order that the torque setting to which a fastening element driven by the tool is to be set may be varied, provision is made to alter the point of release of the latch means. For this purpose the latch member 80 is held in place by a screw 85 which is threaded into a plate 86. The plate 86 is disposed within the housing 81 and its sides engage the inner surface thereof. Thus, the plate serves as a nut for the screw 85. Interposed between the plate 86 and the latch member 80 is a leaf spring 87. The latter serves to bias the latch member 80 downwardly as viewed in Fig. 2. Adjacent the rear end of the housing 81 is an adjusting screw 88 which extends through the side wall of the housing for engagement with the latch member 80 adjacent the rear end thereof. It will be apparent that the axial position of the screw 88 serves to determine the normal relative location of the rear end of the latch member 80 with respect to the housing 81 and thus with respect to the normal relative position of the pin 75 in the handle 15. Inward movement of the adjusting screw 88 causes the latch member 80 to be moved inwardly so that the amount of the end surface thereof for engagement with the forward end of the pin 75 is reduced. As a result, a smaller amount of relative movement of the pin 75, as the handle 15 is moved relative to the casing 10 and the housing 81, is required to release the pin. Similarly, a greater amount of movement will be required for the release of the pin 75 upon withdrawing the adjusting screw 88. Thus, outward movement of the adjusting screw 88 effects a higher torque setting adjustment.

The second of the exemplary forms of the present invention is illustrated in Figs. 11 to 16, inclusive, of the drawings. This form, too, is embodied in a portable pneumatic nut setter, which includes a generally cylindrical casing 110 and a rotary pneumatic motor 111 therein for driving a spindle 112 by means of a driving mechanism including a clutch, generally indicated at 114. As in the first form of the invention shown, in this tool the casing 110 is equipped with a laterally projecting handle 115, which has conveniently incorporated therein a throttle valve mechanism 116 for controlling the supply of pressure fluid to the motor 111. A pressure fluid supply hose (not shown) is adapted to be received by a suitable fitting 118 disposed at the outer end of the handle 115.

The motor 111 includes a vaned rotor 119 mounted on a shaft 120 and rotatable in an eccentrically disposed motor chamber 121 defined by a cylinder 122 and end plates 123 and 124. The end plates are disposed respectively at the opposite ends of the cylinder. Each of the end plates 123 and 124 is conveniently recessed for the reception of bearings 125 for journaling the motor shaft 120.

From the valved handle 115 pressure fluid is supplied to the motor chamber 121 by way of a passage 126 formed in the casing 110 and by way of a somewhat flexible tube 127 interposed between the handle 115 and a laterally projecting boss 128 on the casing 110. From the passage 126 pressure fluid is admitted to the motor chamber 121 by way of an inlet port 129 formed in the rear end plate 123.

Spent pressure fluid is partially exhausted from the motor chamber 121 by way of exhaust slots 130 formed in the cylinder 122. These exhaust slots communicate with an annular exhaust chamber 131 about the cylinder, which is vented to the atmosphere by way of a port 132 formed in the casing 110.

The driving connection between the motor 111 and the spindle 112 includes not only the clutch 114 but also speed-reduction gearing. This gearing is of the planetary type and includes a driving or sun gear 134, rigid with the forward end of the motor shaft 120, and idler or planetary gears 135. The latter are rotatable within a fixed ring gear 136 and are journaled on pins 137 carried by a spider 138.

In the present instance the spider 138 serves additionally to journal the rear end of the spindle 112. For this purpose, the spider is centrally apertured and is provided with an internal groove 138a which serves as an outer race for anti-friction bearing elements 139. The inner race for the bearing elements 139 is defined by an appropriate peripheral groove 112a, formed adjacent the rear end of the spindle 112.

The spider 138 is journaled in anti-friction bearing elements 140. To this end the spider has formed therein a peripheral groove 138b, which serves as an inner race for the bearing elements 140. The outer race therefor is formed by an internally grooved ring 141 fixed within the casing 110.

In this embodiment of the invention the driving connection between the motor and the spindle is effected through the provision of means for utilizing pressure fluid exhausted from the motor 111. Additionally, and as in the first of the illustrative forms of the invention, means, normally conditioned to admit pressure fluid to the tool is provided to interrupt the supply of pressure fluid immediately upon the attainment of the desired torque setting of the fastening element being driven by the tool. More particularly, a portion of the pressure fluid exhausted from the motor 111 is utilized to produce engagement of the clutch 114, and the valved handle 115 of the tool is so constructed and arranged as to interrupt pressure fluid supply substantially simultaneously with the attainment of the desired torque setting by the fastening element being driven.

As shown, the means for utilizing the pressure fluid exhausted from the motor 111 includes a piston 145 which is reciprocable in a cylinder 146 formed adjacent the forward end of the casing 110. The piston 145 is of generally disk-like form and is supported for axial movement with the cylinder 146 on longitudinally disposed studs 147. The studs are rigid with the piston 145 and are longitudinally shiftable through diametrically disposed openings 148 formed in the spider 138. The openings 148 are formed in the spider 138 so that the studs 147 are disposed in between the stud shafts or pins 137, upon which the planetary gears 135 are journaled.

Figure 16:
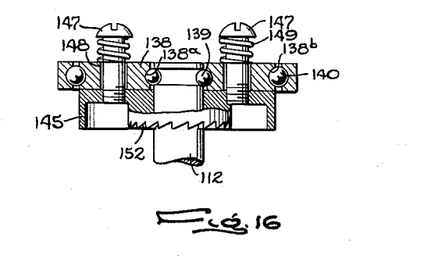
Fig. 16 is a fragmentary longitudinal section taken substantially in the plane of line 16—16 in Fig. 15.

The piston 145 is normally biased rearwardly in the cylinder 146 by means of springs 149 interposed between the rear face of the spider 138 and the heads of the studs 147 (Fig. 16).

Pressure fluid to urge the piston 145 forwardly in the cylinder 146 is supplied from the motor chamber 121 by way of a port 150 in the forward end plate 124 of the motor 111, through the spaces within the ring gear 136 and between the planetary gears 135, and thence through the interstices between the anti-friction bearing elements 140 journaling the spider 138, to the cylinder 146 behind the piston 145. The forward end of the cylinder 146, ahead of the piston 145, is vented to the atmosphere by way of a port 151 in the casing 110.

Conveniently, the piston 145 comprises the driving element of the clutch 114; thus on its forward face there is formed a series of teeth 152. The teeth 152 are adapted, upon forward movement of the piston 145, to mesh with complementally shaped teeth 153 formed on the driven element 154 of the clutch 114. The driven clutch element or lower clutch block 154 is of stepped cylindrical form, and its forward end portion is journaled within a sleeve bearing 155 disposed within the forward end portion of the casing 110. So as to impart rotary motion to the spindle 112, the driven clutch element 154 is non-rotatively connected with the spindle.

It will be apparent from the foregoing that when pressure fluid is admitted to the tool, by way of the valved handle 115, the tube 127, the casing passage 126 to the motor 111, some of the pressure fluid is exhausted from the motor chamber 121 by way of the port 150 into cylinder 146 behind the piston 145. The piston 145 is thus urged forwardly against the action of its biasing springs 149 to the end that the clutch 144 is engaged. Thus a driving connection between the motor 111 and the spindle 112 is effected, and so long as pressure fluid is supplied to actuate the tool, this driving connection is maintained.

As previously noted, the valved handle 115 is constructed and arranged to interrupt the supply of pressure fluid to the tool upon the attainment of the desired torque setting of the fastening element being driven by the tool. As in the first of the exemplary forms of the present invention, the handle 115, which is equipped with the valve mechanism 116, is provided with valve operating means normally conditioned to permit the supply of pressure fluid to the tool upon operation of the valve, which means is effective to cut off the supply of pressure fluid upon relative movement between the handle 115 and the casing 110 in response to the setting resistance offered by the fastening element. The necessary relative movement between the handle 115 and the casing 110 obtains by virtue of the somewhat flexible character of the supporting tube 127, which is interposed between the handle and the casing.

The handle 115 has an axial bore 160 therein within the forward end of which is received the rear end of the tube 127 and within the rear end of which is received the fitting 118 by means of which a pressure fluid supply hose is connected. The valve 116 is disposed intermediate the ends of the bore 160. The valve 116 includes a bushing 161 which is fixed within the bore 160 and is provided with a coaxial bore 162. The valve 116 also includes a poppet element 164 which seats against the rear end of the bushing 161. The element 164 is normally biased into closed position by means of a spring 165 and by the action of live pressure fluid thereon in the rear end of the handle bore 160. The valve element 164 is equipped with a stem 166 which is axially shiftable within the bore 162 of the bushing 161.

The operating mechanism for the valve 116 includes an operating lever 170 comprising fingerpiece 171 pivoted on the handle 115 adjacent its forward end and is disposed along one side thereof for convenient manipulation. The operating lever 170 also includes a valve operating member 172 which is received in a slot 174 extending transversely through the handle 115 and through the forward end portion of the valve bushing 161. The fingerpiece 171 is operatively connected to the valve operating member 172 through the medium of a leaf spring 173 which additionally functions to normally bias the fingerpiece 171 outwardly with respect to the handle 115.

Adjacent the lower end of the valve operating member 172 of the lever 170 is fulcrumed on a pin 175 carried by the handle 115. The pin 175 projects rearwardly into the transverse slot 174 and its rear end is preferably made of generally hemispherical shape for engagement in a hemispherical recess of somewhat larger radius formed in and adjacent the lower end of the valve operating piece 172. Intermediate its ends the valve operating piece 172 engages the forward end of the valve stem 166.

Figures 11, 12:
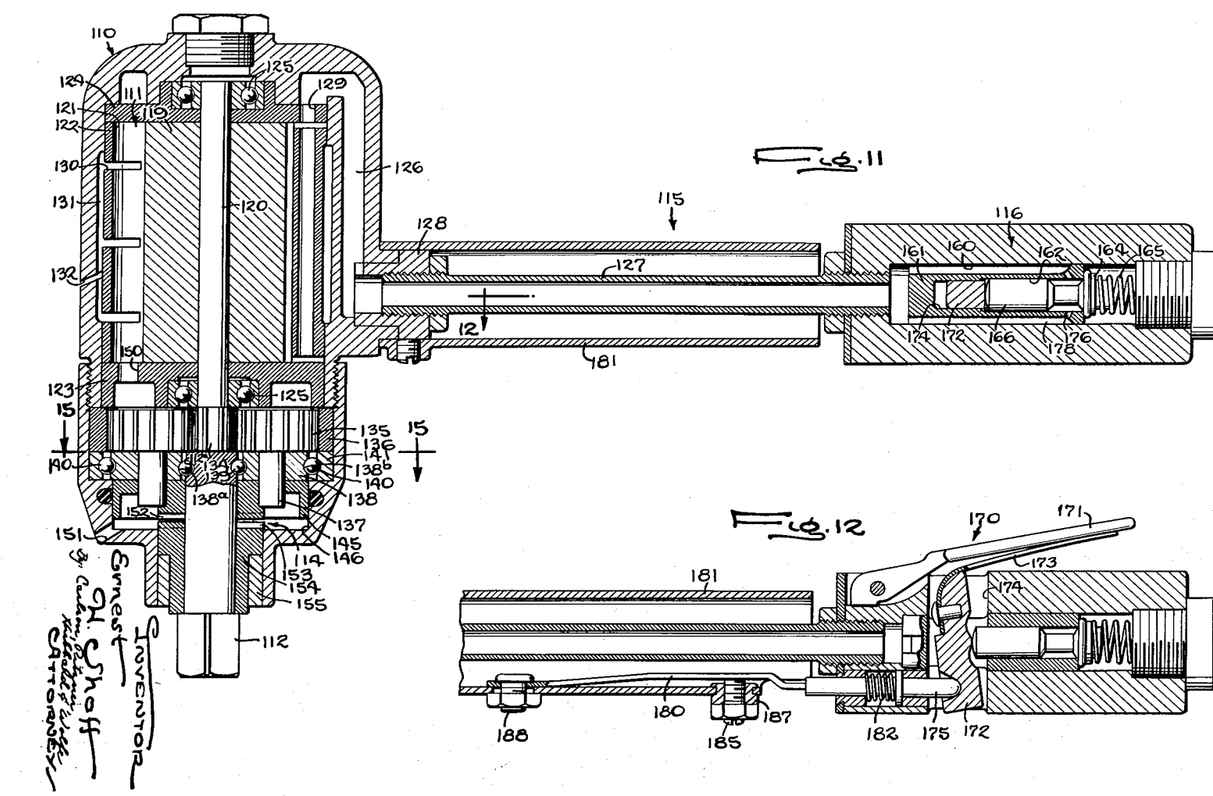
Fig. 11 is a longitudinal section through a modified form of tool embodying the features of the present invention.
Fig. 12 is a fragmentary longitudinal section taken substantially in the plane of line 12—12 in Fig. 11.
Figure 13:
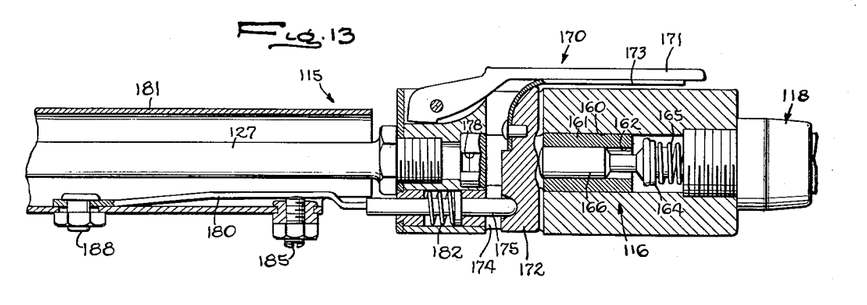
Figs. 13 and 14 are fragmentary longitudinal sections similar to Fig. 12 but illustrating component relationships under various operating conditions of the modified tool shown in Fig. 11.
Figure 14:
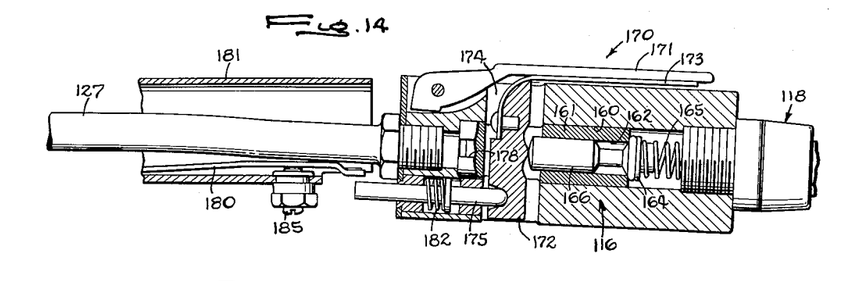
Figure 15:
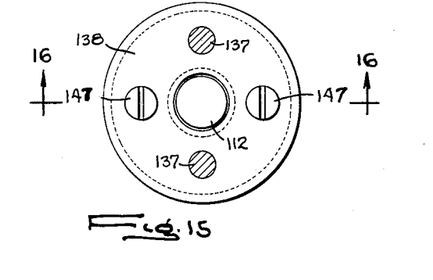
Fig. 15 is a transverse section taken substantially in the plane of line 15—15 in Fig. 11.

It will be apparent that with the components just described occupying the positions illustrated in Fig. 12, depressing the fingerpiece 171 results in rearward movement of the upper end of the valve operating member 172 with a corresponding rearward movement of the valve stem 166 so as to unseat the poppet valve element 164. When this is done, pressure fluid in the valve bore 160 behind the bushing 161 is admitted by way of ports 176 and a pair of longitudinal passages 178 in the bushing 161 to the forward end of the handle bore 160 and thence by way of the tube 127 and the main air supply passage 126 in the casing 110 to the motor 111.

In order to utilize the relative movement between the handle 115 and the casing 110, occurring when a fastening element being driven by the tool is run down tight, to release the valve 116 so as to interrupt the supply of pressure fluid to the tool, means similar to that described in the first of the exemplary forms of the present invention is provided. Thus the instant valve operating mechanism includes trigger means effective to permit forward movement of the lower end of the valve operating member 172 of the lever 170 whereby to release the valve stem 166 and valve 164 for forward movement to seat the latter by the action of the biasing spring 165 and fluid pressure thereon. For this purpose the trigger means includes the fulcrum pin 175 and a latch member 180 for cooperation therewith. The latch member 180 is adjustably supported within a housing 181 which is rigid with the boss 128 and projects rearwardly therefrom about the tube 127 terminating in spaced relation to the handle 115. The fulcrum pin 175 is longitudinally shifted within the handle 115 and is normally biased rearwardly by means of a spring 182. The forward end of the pin 175 projects forwardly from the handle 115 where it is adapted to engage in rear end of the latch member 180.

It will be apparent that the spring 182 in its action biasing the pin 175 rearwardly also serves to bias the lower end of the valve operating member 172 rearwardly. Through conjoint operation of the springs 173, 165 (acting through the valve 164 and the stem 166) and the spring 182 (acting through the pin 175), the parts 171 and 172 of the valve operating lever 170 are biased toward their normal, "the rest," positions as shown in Fig. 12.

When the desired torque setting of the fastening element being driven obtains and relative lateral movement is produced between the handle 115 and the casing 110, similar movement is effected between the pin 175 and the latch member 180. As a result, the forward end of the pin 175 is so moved that it can slip from engagement from the rear end of the latch member 180. When the pin 175 does slip from engagement with the latch member 180, the pin is freed for forward movement. When the pin 175 is freed for forward movement, the lower end of the valve operating piece 172 can move forward. As a result, the valve stem 166 and the valve member 164 are released to the action of the biasing spring 165 and the action of live pressure fluid in the rear end of the handle bore 160. Whereupon the valve stem 166 and the valve 164 are moved forwardly, producing a corresponding movement of the valve operating lever 170 and the valve operating member 172 into the position shown in Fig. 14 with the result that the valve 164 is seated and the supply of pressure fluid to the tool is interrupted. This action, of course, occurs at substantially the same instant as that when the desired torque setting of the driven fastening element obtains.

In this form of the invention provision is also made for adjusting the torque setting of the tool. This is accomplished in substantially the same manner as with the first form of the invention described through the utilization of an adjusting screw 185 which is threaded into a bushing 187 in the housing 181 adjacent the rear end thereof. The forward end of the latch member 180 is fastened to the housing 181 near the forward end thereof as by a screw-and-nut assembly 188. The screw 185 is disposed for engagement with and adjacent the rear end of the latch 180. It will be apparent that the axial position of the screw 185 serves to determine the relative location of the rear end of the latch member 180 with respect to the forward end of the pin 175 in the handle 115. Inward movement of the adjusting screw 185 produces a corresponding inward movement of the latch member 180 so that the amount of relative lateral movement between the forward end of the pin 175 and the rear end of the latch member 180 for disengagement of the latter from the former is correspondingly reduced. Similarly a greater amount of relative lateral movement is required for the release of the pin 175 upon withdrawing the adjusting screw 185. Thus outward movement of the adjusting screw 185 affords a higher torque setting adjustment.

It will be apparent from the foregoing that by virtue of the present invention there is provided a power actuated tool embodying an improved torque responsive control which, upon the attainment of a particular desired torque setting by a fastening element being driven, is effective to interrupt the connection between the driving and driven components of the tool. Thus the former are permitted to rotate independently of the latter and the momentum acquired thereby during free-running of the fastening element is not transmitted to the fastening element. By virtue of this construction and arrangement, therefore, exceedingly accurate torque setting in a power-driven tool is attainable.

I claim as my invention:

1. In a power operated tool for running and setting threaded fastening elements having a motor and a spindle adapted to be driven by the motor, the combination comprising a normally disengaged driving connection interposed between the motor and the spindle, means responsive to the application of power to the tool for engaging said connection, and means effective upon the attainment of a desired torque setting of a fastening element being set by the tool for interrupting the supply of power to the tool to permit disengagement of said connection, whereby to prevent transmission of momentum acquired by the motor during running of the fastening element to the spindle and the fastening element after the attainment of the desired torque setting.

2. In a pressure fluid operated tool for running and setting a threaded fastening element having a motor and a spindle adapted to be driven by the motor, said motor having a hollow shaft the combination comprising a normally disengaged clutch interposed between the motor and the spindle, a cylinder having communication with the supply of pressure fluid to the motor, a piston reciprocable in said cylinder and operatively connected through said hollow shaft with said clutch for effecting engagement thereof in response to the application of pressure fluid to the tool.

3. In a power operated tool for running and setting a threaded fastening element having a motor and a spindle, the combination comprising a normally disengaged driving connection interposed between the motor and the spindle, means responsive to the application of power to the tool for engaging said connection, and means normally conditioned to admit the application of power to the tool and effective to interrupt the supply of power in response to the attainment of a desired torque setting by the fastening element being set by the tool so as to permit disengagement of said connection whereby to prevent transmission of momentum acquired by the motor during running of the fastening element to the spindle and the fastening element after the attainment of the desired torque setting.

4. A pressure fluid operated tool for running and setting a threaded fastening element comprising, in combination, a casing, a fluid motor disposed within said casing and having a hollow shaft and speed reduction gearing driven thereby, a spindle journaled in one end of said casing and adapted to be driven by said motor through said speed reduction gearing, a normally disengaged clutch interposed between said gearing and said spindle, a cylinder at the other end of said casing having communication with the supply of pressure fluid to said motor, a piston reciprocable in said cylinder, and a push rod extending through said hollow shaft and operatively connected with said piston and said clutch for effecting engagement of said clutch in response to the application of pressure fluid to said motor.

5. A pressure fluid operated tool for running and setting a threaded fastening element comprising, in combination, a casing, a fluid motor disposed within said casing and having a hollow shaft and speed reduction gearing driven thereby, a spindle journaled in one end of said casing and adapted to be driven by said motor through said speed reduction gearing, a normally disengaged clutch interposed between said gearing and said spindle, a cylinder at the other end of said casing having communication with the supply of pressure fluid to said motor, a piston reciprocable in said cylinder, a push rod operated by said piston and extending through said hollow shaft and operatively connected with said clutch for effecting engagement of said clutch in response to the application of pressure fluid to said motor, a handle including a valve for controlling the supply of pressure fluid to the tool, a member supporting said handle and said casing in laterally spaced relation, said member being yieldable to permit relative movement between said casing and said handle upon the attainment of a desired torque setting of the fastening element being set by the tool, and means for operating said valve and effective to close said valve upon relative movement between said casing and said handle to interrupt the supply of pressure fluid to the tool so as to permit disengagement of said clutch.

6. A pressure fluid operated tool for running and setting a threaded fastening element comprising, in combination, a casing, a fluid motor disposed within said casing, a spindle journaled in said casing and adapted to be driven by said motor, a normally disengaged clutch interposed between said motor and said spindle, a cylinder having communication with the supply of pressure fluid to said motor, a piston reciprocable in said cylinder and operatively connected with said clutch for effecting engagement of said clutch in response to the application of pressure fluid to the tool, a handle including a valve for controlling the supply of pressure fluid to the tool, a member supporting said handle and said casing in laterally spaced relation, said member being yieldable to permit relative movement between said casing and said handle upon the attainment of a desired torque setting of the fastening element being set by the tool, and means for operating said valve and effective to close said valve upon relative movement between said casing and said handle to interrupt the supply of fluid to the tool so as to permit disengagement of said clutch.

7. In a power operated tool for running and setting a threaded fastening element, the combination comprising a casing, a handle, means for supporting said handle and said casing in laterally spaced relation and for permitting relative movement between the same upon the attainment of a desired torque setting of the fastening element being set by the tool and means for controlling the supply of power to the tool and responsive to the relative movement between said handle and said casing for operating said power supply controlling means to interrupt the supply of power to the tool.

8. In a pressure fluid operated tool for running and setting a threaded fastening element, the combination comprising a casing, a handle including a valve for controlling the supply of pressure fluid to the tool, a member supporting said handle and said casing in laterally spaced relation, said member being yieldable to permit relative movement between said casing and said handle upon the attainment of a desired torque setting of the fastening element being set by the tool, and means for operating said valve and effective to close said valve upon relative movement between said casing and said handle to interrupt the supply of pressure fluid to the tool.

9. In a pressure fluid operated tool for running and setting a threaded fastening element, the combination comprising a casing, a handle adapted for connection with a source of pressure fluid and including a valve normally biased into closed position for controlling the supply of pressure fluid to the tool, a yieldable tubular member supporting said handle and casing in laterally spaced relation and supplying pressure fluid from said handle to said casing, a valve operator carried by said handle, a yieldable fulcrum for said operator carried by said handle, and a latch for said fulcrum including a member stationary with respect to said casing, said supporting member permitting relative movement between said handle and said casing upon the attainment of a desired torque setting by the fastening element being set by the tool, and said latch being responsive to such relative movement for releasing said fulcrum and valve operator to permit said valve to interrupt the supply of pressure fluid to the tool.

10. In a pressure fluid operated tool for running and setting a threaded fastening element, the combination comprising a casing, a handle having a bore therein communicating with said casing and adapted for connection with a source of pressure fluid, a valve in said bore and normally biased into closed position for controlling the supply of pressure fluid to said casing, a yieldable member supporting said handle and casing in spaced relation, a valve operator, a yieldable fulcrum for said operator, and a latch for said fulcrum, said supporting member permitting relative movement between said handle and said casing upon the attainment of a desired torque setting by the fastening element being set by the tool, and said latch being responsive to such relative movement for releasing said fulcrum and valve operator to permit said valve to interrupt the supply of pressure fluid to the tool.

11. In a pressure fluid operated tool for running and and setting a threaded fastening element, the combination comprising a casing, a handle having a bore therein communicating with said casing and adapted for connection with a source of pressure fluid, a valve received in said bore and normally biased into closed position for controlling the supply of pressure fluid to said casing, a yieldable member supporting said handle and casing in laterally spaced relation, a valve operator including a member engageable with said valve intermediate its ends to open the same, a yieldable fulcrum engageable with said operator adjacent one end thereof, and a latch for said fulcrum including a member stationary with respect to said casing, said supporting member permitting relative movement between said handle and said casing upon the attainment of a desired torque setting by the fastening element being set by the tool, and said latch being responsive to such relative movement for releasing said fulcrum and valve operator to permit said valve to interrupt the supply of pressure fluid to the tool.

12. A pressure fluid operated tool for running and setting a threaded fastening element comprising, in combination, a casing, a fluid motor disposed within said casing, a speed reduction gearing driven by said motor, a spindle journaled in said casing, a normally disengaged clutch interposed between said gearing and said spindle including driving and driven elements, a cylinder having communication with said motor, said driving clutch element constituting a piston reciprocable in said cylinder for effecting engagement of said clutch in response to the application of pressure fluid to said motor, and means effective upon the attainment of a desired torque setting by a fastening element being set by the tool for interrupting the application of pressure fluid to the motor to permit disengagement of said clutch, whereby to prevent transmission of momentum acquired by the motor during running of the fastening element to the spindle and the fastening element after the attainment of the desired torque setting.

13. A pressure fluid operated tool for running and setting a threaded fastening element comprising, in combination, a casing, a fluid motor disposed within said casing, a spindle journaled in said casing and adapted to be driven by said motor, a normally disengaged clutch having a driving element connected with said motor and a driven element connected to said spindle, a cylinder having communication with said motor, a piston reciprocable in said cylinder and rigid with said driving clutch element for effecting engagement of said clutch in response to the application of pressure fluid to said motor, and means effective upon the attainment of a desired torque setting by a fastening element being set by the tool for interrupting the application of pressure fluid to the motor to permit disengagement of said clutch, whereby to prevent transmission of momentum acquired by the motor during running of the fastening element to the spindle and the fastening element after the attainment of the desired torque setting.

14. A pressure fluid operated tool for running and setting a threaded fastening element comprising, in combination, a casing, a fluid motor disposed within said casing, speed reduction gearing driven by said motor, a spindle journaled in said casing, a normally disengaged clutch interposed between said gearing and said spindle including driving and driven elements, a cylinder having communication with said motor, said driving clutch element constituting a piston reciprocable in said cylinder for effecting engagement of said clutch in response to the application of pressure fluid to said motor, a handle including a yieldable member supporting the same on said casing and permitting relative movement thereof with respect to said casing upon the attainment of a desired torque setting of the fastening element being set by the tool, and means including a valve for controlling the supply of pressure fluid to the tool and effective upon the aforesaid relative movement to interrupt the supply of pressure fluid to the tool so as to permit disengagement of said clutch.

References Cited in the file of this patent

UNITED STATES PATENTS

| | | |
|---|---|---|
| 2,130,111 | Whitney et al. | Sept. 13, 1938 |
| 2,158,303 | Pott | May 16, 1939 |
| 2,476,632 | Shaff | July 19, 1949 |
| 2,543,979 | Maurer | Mar. 6, 1951 |
| 2,614,419 | Shaff | Oct. 21, 1952 |